(12) United States Patent
Gasa et al.

(10) Patent No.: US 11,820,909 B2
(45) Date of Patent: Nov. 21, 2023

(54) EPOXY COATING COMPOSITION WITH ELEVATED TEMPERATURE AND ABRASIVE ENVIRONMENT PERFORMACE AND USES THEREOF

(71) Applicant: Illinois Tool Works Inc., Glenview, IL (US)

(72) Inventors: Jeffrey V. Gasa, Glenview, IL (US); Salvatore N. Parisi, Glenview, IL (US); Katherine P. Scacchi, Glenview, IL (US); Peter A. Carbutt, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 104 days.

(21) Appl. No.: 17/491,659

(22) Filed: Oct. 1, 2021

(65) Prior Publication Data
US 2022/0112395 A1    Apr. 14, 2022

Related U.S. Application Data

(60) Provisional application No. 63/091,364, filed on Oct. 14, 2020.

(51) Int. Cl.
*C09D 163/04* (2006.01)
*C09D 7/62* (2018.01)
*C09D 7/40* (2018.01)
*C09D 7/65* (2018.01)

(52) U.S. Cl.
CPC ............. *C09D 163/04* (2013.01); *C09D 7/62* (2018.01); *C09D 7/65* (2018.01); *C09D 7/69* (2018.01); *C09D 7/70* (2018.01)

(58) Field of Classification Search
CPC .................................................. C09D 163/04
See application file for complete search history.

(56) References Cited

U.S. PATENT DOCUMENTS

| 9,040,607 B2 * | 5/2015 | Surjan ..................... C09J 163/04 524/541 |
| 2013/0337203 A1 * | 12/2013 | Jackson .................. C08L 63/00 523/427 |
| 2021/0395562 A1 * | 12/2021 | Bardts ................. C08G 59/5006 |

FOREIGN PATENT DOCUMENTS

JP    2000219799 A  *  8/2000

OTHER PUBLICATIONS

Machine translation of JP 2000-219799, published Aug. 8, 2008, retrieved from Espacenet on May 19, 2023.*

* cited by examiner

*Primary Examiner* — Vickey Nerangis
(74) *Attorney, Agent, or Firm* — MaxGoLaw PLLC

(57) ABSTRACT

A two part composition formulation is provided with a composition part A including a phenol novolac epoxy in combination with a bisphenol F epoxy, bisphenol A epoxy, or a combination thereof that define a base resin. A resorcinol diglycidyl ether present is present in part A in a ratio of 1.5-25:1 relative to the base resin. A part A inorganic particulate has x-y-z average linear dimension of between 500 and 6,000 microns. An activator part B includes a curative operative to cure the base resin and the resorcinol diglycidyl ether along with a part B inorganic particulate has x-y-z average linear dimension of between 500 and 6,000 microns. A coating is obtained upon mixing and cure in contact with a substrate to form a corrosion and abrasion resistant structure. A process of forming such a structure is also provided.

20 Claims, No Drawings

EPOXY COATING COMPOSITION WITH ELEVATED TEMPERATURE AND ABRASIVE ENVIRONMENT PERFORMACE AND USES THEREOF

RELATED APPLICATIONS

This application is a non-provisional application that claims priority benefit of U.S. Provisional Application Ser. No. 63/091,364 filed 14 Oct. 2020; the contents of which are hereby incorporated by reference.

FIELD OF THE INVENTION

The present invention in general relates to epoxy coatings, and in particular to a coatings that impart abrasion resistance to substrates that may also experience elevated temperatures and corrosive environments.

BACKGROUND OF THE INVENTION

Epoxies are widely used as coating in situations where a substrate is in need of protection from corrosive environment, even at elevated temperatures. Such conditions are routinely found in variety of settings such oil exploration, industrial processing equipment, water heaters, mining equipment, construction equipment, metallurgy equipment, combustion engines, scrubbers, and ash handling equipment. Typical substrates in need of such protection include various steels ad aluminum alloys. Environmental sources of corrosion illustratively include salinity, oxidative gas exposure, or extremes of pH, such as below pH 4 or above pH 10. Epoxies as prototypical phenolic coatings are commercially available that can operate at elevated temperatures of above 100 degrees Celsius for prolonged periods of time and as high as 175 degrees Celsius.

While epoxies have good adhesion to the aforementioned substrates, this presents a problem when such coatings become worn and need to be re-applied. In fact, epoxies are prone to spalling and other modes of wear when exposed to abrasives in the use environment. To removal of such a coating and reapplication are labor intensive processes and as such there is a desire to apply a coating with an extended operating lifetime. Abrasion often occurs when inorganic materials are conveyed into contact with coating. To extend the operational lifetime of epoxy coatings these are routinely loaded with inorganic oxide particulate such as silica or alumina with a size of usually less than 200 microns in amounts of usually up to about 30 total weight percent. The particle size is chosen to disperse in the epoxy matrix and impart a degree of hardness to the resulting coating. Typically, fine particulate is dispersed in an uncured resin with particle longest linear dimensions being less than 1% of the intended coating thickness to form a smooth coating with particles dispersed throughout. Alternatively, a layer of uncured resin is applied to a substrate and the uncured coating surface has particulate applied to, and embedded into the uncured coating surface.

Conventional techniques of using epoxy resins as coatings intended to operate at the aforementioned extreme conditions are complicated when a desired coating thickness is between 3,000 and 20,000 microns. Comparatively thick coatings such as these with comparatively large particulate require greater control over cure behavior, interfacial properties between the matrix and particulate, and uncured viscosity, as compared to thinner coatings. Yet, such comparatively thick coatings afford a superior barrier and offer the prospect of longer operational lifetime compared to thinner coatings below 3,000 microns.

Thus, there exists a need for an epoxy coating formulation adapted to be applied to a substrate at a thickness of the between 3,000 and 20,000 microns and inclusive of high loadings of large ceramic particulate to impart outstanding abrasion resistance to substrate that is also exposed potentially exposed to elevated temperatures and corrosive environments. There further exists a need for a cured coating so formed on a substrate.

SUMMARY OF THE INVENTION

A two part composition formulation is provided with a composition part A including a phenol novolac epoxy in combination with a bisphenol F epoxy, bisphenol A epoxy, or a combination thereof that define a base resin. A resorcinol diglycidyl ether present is present in part A in a ratio of 1.5-25:1 relative to the base resin. A part A inorganic particulate has x-y-z average linear dimension of between 500 and 6,000 microns. An activator part B includes a curative operative to cure the base resin and the resorcinol diglycidyl ether along with a part B inorganic particulate has x-y-z average linear dimension of 500 and 6,000 microns. A coating is obtained upon mixing and cure in contact with a substrate to form a corrosion and abrasion resistant structure. A process of forming such a structure is also provided.

DETAILED DESCRIPTION OF THE INVENTION

The present invention has utility as a two-component epoxy coating composition that is applied coating thickness of 2 to 24 mm and contains loadings in excess of 45 weight percent of inorganic particles. The inorganic particles having an average size based on particle number of between 500 and 6,000 microns with the proviso that ratio of average particle size to the coating thickness is between 0.01-0.3:1. The resulting cured coating formed from the composition demonstrates stability at operating temperatures of up to 160° C., corrosion resistance to resistance to a wide range of acids, bases, salt solutions, oils, and combinations thereof conventional to epoxy coatings while having enhanced abrasion resistance against materials brought into contact with the coating. In some inventive embodiments, an uncured composition as provide herein is sufficiently viscous to be troweled onto overhead or vertical surfaces without sagging prior to cure.

Without intending to be bound to a particular theory, the high loading of inorganic particles and the comparatively large size of such particles compared to the prior art behave like an inorganic coating from an abrasion standpoint while sufficient epoxy is present to impart corrosion resistance to protect the underlying substrate.

Embodiments of the inventive composition have superior impact strength and overlap shear strength (OLS) on a variety of metal substrates illustratively including stainless steel, galvanized steel, nickel plated/coated steel (NIS), chromium steel, mild steel, carbon steel, aluminium, and alloys thereof containing a majority by atomic percent aluminium, brass, pewter, bronze, and laminates containing any of the aforementioned. The aforementioned materials are commonly used in oil exploration, industrial processing equipment, water heaters, mining equipment, construction equipment, metallurgy equipment, combustion engines, scrubbers, and ash handling equipment.

In some embodiments of the present inventive the epoxy composition cures at room temperature. Being room temperature curing, embodiments of the inventive composition invariably inhibit of microvoid formation during snap curing at elevated temperature. Some embodiments of the inventive composition are aptly designed with a balance of viscosity and thixotropic behaviour to enable dispensing through a handheld. In other inventive embodiments, the uncured composition is manually applied with a trowel to a substrate. It is appreciated that the cure temperature can be dynamic and raised during cure to inhibit thermal stress on the cured coating. For example, a substrate that is maintained at a steady state operating temperature retains reduced stress It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive formulation provided as a two-part formulation includes an composition part that is synonymously referred to as Part A, or an composition Part A. The composition part of inventive formulation as a two-part formulation in prototypical form includes all the components active in the polymerization reaction except that a cure activator. The activator is predominantly in an activator part that is synonymously referred to as Part B or an activator Part B. The following components of an inventive formulation are detailed as weight percentages of a formulated Part A or Part B inclusive of all components intended to be mixed at a part A:part B volume ratio of 2:1 unless specifically specified.

Embodiments of the inventive two-part composition have a first component part (component A) that is a resin that is a blend of epoxy resins, inorganic particles, and optionally additives such as powder or fiber fillers, thixotropes, a cure inhibitor, a toughening agent, a part A colorant, or a combination thereof; and a second component part (component B) that is a curative that is a blend of amines, and optionally additives such as fillers, thixotropes, a cure inhibitor, an adhesion promoter, a part B colorant.

The inventive formulation in certain embodiments is provided in a user friendly volume mix ratio of Composition Part A to Activator Part B of 1:1, 2:1 or even 3-10:1. Development of strength and fixture time of a cured inventive composition on a variety of metal substrates associated with equipment exposed to abrasive contact is found to perform better than conventional compositions.

Typical expoxy resins operative in the present invention are epoxidized novolacs, particularly the epoxy cresol and epoxy phenol novolacs. These are produced by reacting a novolac resin with epichlorohydrin in the presence of an alkaline catalyst. Through control of reaction conditions and stoichiometry resins of different molecular weight are made. Other usable epoxy resins include the diglycidyl ethers of other bisphenol compounds such as bisphenol A, B, F, G and H. Epoxy resins of the type described above based on various bisphenols are available from a wide variety of commercial sources.

Epoxy resins derived from non-benzenoid materials such as aliphatic or cycloaliphatic hydroxy-containing compounds are also operative in the present invention. Epoxy resins having non-aryl molecular structures generally are referred to in the art as being aliphatic epoxy resins or cycloaliphatic epoxy resins. Aliphatic epoxy resins are prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin to form liquid epoxy resins characterized by viscosities which are lower than epoxy resins derived from aromatic hydroxy compounds.

The epoxy resins present in part A has an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since the reactants are typically mixtures of chemical compounds that vary in average molecular weights, the epoxy equivalency of the products is not necessarily the integer 2.0. Yet, according to the present invention, the equivalency is generally a value of between 1.0 and 6.0 for novolocs and between 1.0 and 2.0 for linear epoxy resins. Epoxidized novolac resins which are useful in the present invention generally are prepared by the reaction of epichlorohydrin with phenol formaldehyde condensates. The epoxidized novolacs may contain more than two epoxy groups per molecule, and epoxidized novolacs having up to 7 to more epoxy groups are commercially available. The use of epoxidized novolacs containing more than two epoxy groups per molecule results in products containing a highly cross-linked structure.

A secondary epoxy resin used in several of the following examples is a diglycidylether of bisphenol F (DGEBF) with epoxide equivalent weight: 166-176 g/equivalent and density at 25° C. of 1.18 g/cm$^3$, it is appreciated that variations in epoxide equivalent weight can vary between 140 and 500 g/equivalent and can vary in viscosities depending on the mode of application and convenience of use. Alternative epoxy resins can vary in monomer backbone as detailed above and include bisphenol A, B, G and H, aliphatics, novolocs, and copolymers thereof. Typically, the base epoxy resin that a combination of novoloc epoxy resin with one or more of bisphenol A, B, F, G, or H epoxy is present from 10 total weight percent to the remainder total weight percent of Part A, and in other formulations from 10 to 45 total weight percent of part A.

Owing to the exceptional requirements of an inventive formulation to retain large filler particles and retain high temperature performance and corrosion resistance, in several inventive embodiments a combination of epoxies are co-cured to form the matrix of an inventive coating. A particularly useful epoxy combination includes a phenol novolac epoxy in concert with bisphenol F epoxy, bisphenol A epoxy or a combination thereof. The weight ratio of phenol novolac epoxy:bisphenol F and/or bisphenol A is 0.2-4:1. In still other inventive embodiments, a lesser amount of a resorcinol diglycidyl ether (RDGE) is present. In those embodiments containing RDGE, the weight ratio of the summation of the amounts of phenol novolac epoxy in concert with bisphenol F epoxy, bisphenol A epoxy or a combination thereof: RDGE is 1.5-25:1. In some inventive embodiments, the RDGE is present from 3-30 total weight percent.

In still other inventive embodiments, an epoxy-terminated butadiene acrylonitrile copolymer (ETBN), a cyclohexanedimethanol diglycidyl ether, or a combination thereof is present. The epoxy-terminated butadiene acrylonitrile copolymer (ETBN), a cyclohexanedimethanol diglycidyl ether, or the combination thereof are present from 0 to 30 cureable epoxy weight percent of the formulation part A without regard for other part A components.

An impact modifier is also present in an inventive formulation. An impact modifier operative herein illustratively includes styrene butadiene copolymers, rubbers, polycarbonates, core-shell rubber (CSR) in epoxy resin; a latex rubber particle with a crosslinked polymeric shell in epoxy resin, a siloxane core with a crosslinked polymeric shell, or a combination thereof. Specific impact modifiers operative herein include methyl methacrylate butadiene styrene copolymers (MBS), nitrile rubber, blocked copolymers of styrene butadiene, buna rubbers, acrylonotrile butadiene styrene, and combinations thereof. It is appreciated that impact modifiers devoid of moieties cured by the curative of part B, that such impact modifiers can be present in part A, part B, or a combination thereof. Typically, such impact modifiers are present from 0 to 10 total weight percent of part A, or a like total amount when dispersed in part B, or a combination of parts A and B. The impact modifiers operate in the present invention to increase the strength of the composition under physical stress conditions as compared to formulations devoid of the impact modifier combination. Crosslinked polymeric shell materials illustratively include acrylics, siloxanes, methylacrylics, and combinations thereof. Methyl methacrylate-butadiene-styrene (MBS) is exemplary of CSR impart modifiers. When a particulate impact modifier is dispersed in an epoxy resin medium, the particulate core-shell is typically present from 1 to 8 total weight percent of the epoxy resin medium.

An adhesion promoter is also optionally present in certain inventive formulations to achieve improved surface bonding of inventive composition compared to formulations lacking the same by modifying the hydrophobicity of the substrate surface. Adhesion promoters operative herein illustratively include phosphate esters; phosphate ester polymers; mixtures of mono- and di-functional phosphates; functionalized methacrylates such as hydroxyethylmethacrylate succinate, acetoacetoxy ethyl methacrylate, N,N-diethylaminoethyl methacrylate, ethoxylated bisphenol A dimethacrylate and methacrylate silanes and combinations thereof. In still other embodiments, a silanizing agent modifies the substrate surface to achieve improved surface bonding of inventive composition compared to formulations lacking the same by modifying the hydrophobicity of the substrate surface. Typically, adhesion promoters are present from 0 to 0.5 total weight percent of Part A. In still other embodiments the adhesion promoter is present from 0.1 to 0.5 total weight percent of Part A. It is appreciated that adhesion promoters devoid of a moieties cured by the curative of part B, that such impact modifiers can be present in part A, or a like total amount when dispersed in part B, or a combination of parts A and B.

A cure inhibitor is optionally present in an inventive formulation. A cure inhibitor operative herein illustratively includes benzoquinone, naphthoquinone, hydroquinone, 4-hydroxy 2,2,6,6-tetramethylpiperidine 1-oxyl (TEMPOL) or TEMPO, halogenated tallow alkyl amines, aziridine, polyaziridines, dihydrocarbyl hydroxyl amine, 2,2,6,6-tetramethyl-piperidimyloxyl (TEMPO); 2,2,5,5-tetra-methyl-pyrolyloxy (PROXYL) or a combination thereof that operate synergistically to provide storage stability to an inventive formulation. Typically, a cure inhibitor is present from 0 to 0.2 total weight percent of Part A. In still other embodiments the cure inhibitor is present from 0.1 to 0.2 total weight percent of Part A. It is appreciated that a cure inhibitor is readily provided in both Parts A and B of an inventive formulation to promote storage stability and limit premature curing prior at application to a substrate.

A cure accelerator is also present in an inventive formulation to kinetically speed curing of the formulation monomer compared to inventive formulations devoid of a cure accelerator. Cure of the resins in contact with a substrate allows the formulation to function as a protective coating for the substrate under the harsh conditions detailed above. Accelerators operative herein illustratively include a pyridine derivative, a butaraldehyde aniline condensate, N,N-dimethylaniline, N,N-dimethyltoludiene, N,N-diethyltoludiene, metal acetyl acetonate, and combinations thereof. Typically, cure accelerators are present from 0 to 2.5 total weight percent of Part A. In certain inventive embodiments, the cure accelerator is present in both Parts A and B; however, storage stability is generally enhanced by segregation of the cure accelerator in Part B and separate from any cure initiators in the inventive formulation, that are commonly in Part A.

An inorganic particulate filler is present as largest single component by weight of an inventive formulation and the coatings formed therefrom. The inorganic particulate has x-y-z average linear dimension of between 500 and 6,000 microns with the proviso x-y-z average linear dimension is no larger than 30% of the coating thickness as applied to the substrate. The inorganic particulate filler. As used herein, "x-y-z average linear dimension" defines the average linear extent of a particle in three orthogonal directions defined by x axis, y axis, and z axis. The inorganic particulate filler in some inventive embodiments is spherical while in other embodiments the particles surface is irregular and has an aspect ratio between longest and shortest orthogonal directions of between 1 and 1.6. The inorganic particulate filler is polycrystalline or amorphous. In some inventive embodiments, the inorganic particulate filler is pre-coated with one of the aforementioned resins to facilitate dispersion.

The inorganic particulate filler material is limited only by the size and stability with the curable matrix materials and under coating operating conditions. The inorganic particulate filler material operative herein illustratively includes oxides of aluminum, gallium, silicon, magnesium, transition metals, or a combination thereof or hydrous oxides thereof; nitrides of aluminum, gallium, silicon, transition metals, or a combination thereof; or carbonates of calcium, magnesium, or a combination thereof. Specific examples of which include zirconia, bauxite, boehmite, diaspore, gibbsite, silicon nitride, and limestone, dolomite.

It is appreciated that in addition to the afore-mentioned components, an inventive formulation is readily modified to include other additives to modify the properties of the Part A, Part B during storage, or the resulting cured composition. These additives illustratively include a thixotrope, a powder or fiber filler, a pigment, a plasticizer, a chain terminating agent, a corrosion inhibitor, a fire retardant, and combinations thereof. Such additives are limited only by the requirement of compatibility with the other components of an inventive formulation and stability under the operating conditions to which the resulting cured coating is exposed. Such additives are provided to balance or otherwise modify at least one property of an inventive formulation as to handling, storage, cure rate, or composition properties. Typically, an additive of an inert filler is present from 0 to 20 total weight percent of an inventive formulation upon combination of Part A and Part B. Typically, the other aforementioned additives are each independently present from 0 to 5 total weight percent of Part A or a like total amount when dispersed in part B, or a combination of parts A and B.

A thixotrope serves to modify the viscosity of the formulation in a shear dependent way. Thixotropes operative herein illustratively include fumed silica, fumed silica which has been surface treated with polydimethylsiloxane (PDMS), hydrogenated castor oil, organoclays, or miscible combinations thereof.

A powder or fiber filler is a particulate or fiber that is smaller in x-y-z average linear dimension than the inorganic particulate filler. It is appreciated that powder filler can reside in interstices between particle of the inorganic particulate while fiber fillers tend to impart longer range strength to the resulting coating. A powder or fiber filler is limited only by the size and stability with the curable matrix materials and under coating operating conditions. Powder or fiber fillers operative herein illustratively include the aforementioned inorganic particulate filler materials, glass fiber, rock wool, carbon fiber, alumina fiber, wollastonite potassium titanate fiber, and combinations thereof.

A pigment is a particulate colorant that provides a visual designator between parts A and B, as well confirmation of mixing therewith. Conventional pigments are black for part A and white for part B, or vice versa so as to afford a gray mixed formulation. In still other embodiments, a blue pigment is added to part A and a yellow pigment to part B, or vice versa so as to afford a green mixed formulation.

Table 1 provides weight percentages for the ingredients of an embodiments of component A as described above.

TABLE 1

Weight percentage of constituent ingredients of part A.

| Ingredients | Typical Weight (%) of part A | Specific Weight (%) of part A |
| --- | --- | --- |
| Phenol novolac epoxy in concert with one or more of bisphenol A, B, F, G, or H epoxy (base epoxy resin) | remainder | 10-45 |
| Resorcinol diglycidyl ether (RDGE) | 1.5-25:1 ratio relative to base resins | 3-30 |
| Epoxy-terminated butadiene acrylonitrile copolymer (ETBN), a cyclohexanedimethanol diglycidyl ether | 0-30 | 1-5 |
| Impact Modifier- e.g. core-shell particles 10 to 30 wt % in epoxy resin medium | 0-15 | 1-9 |
| Inorganic particulate material | 50-83 | remainder |
| Cure inhibitor | 0-5 | 0.01-0.3 |
| Cure accelerator | 0-5 | 0.01-0.3 |
| Thixotrope | 0-5 | 1.5-3.0 |
| Pigment | 0-1 | 0.005-0.1 |
| Powder or fiber filler | 0-20 | 3-15 |
| Various additives: plasticizer, chain transfer agent, corrosion inhibitor, fire retardant, each present at: | 0-5 | 0.2-1.5 |

In a specific embodiment, part A includes 18 part A total weight percent of 3.6 functional epoxy phenol novolac resin with 9 part A total weight percent of bis phenol F-epoxy resin with 166-176 g/equivalent and density at 25° C. of 1.18 g/cm$^3$, 2 part A total weight percent of ETBN, 2.7 part A total weight percent of RDGE and a remainder of 2380 micron bauxite spheres.

Embodiments of part B include a curative, inorganic particulate materials, and optional additives.

A curative present in part B is reactive towards the epoxy resin components of part A. Curatives operative herein include aliphatic amines, aromatic amines, polyamine epoxy-resin adduct, ketimine, polyamide resin, polymercaptans, and combinations thereof. Specific curatives operative herein include diethylenetriamine, triethylenetetramine, tetraethylenepentamine, diproprenediamine, diethylaminopropylamine, n-aminoethylpiperazine, menthane diamine, isophoronediamine, m-xylenediamine, metaphenylene diamine, diaminodiphenylmethane, diaminodiphenylsulfone, polyamine epoxy-resin adduct, ketimine, polyamide resin, liquid polymercaptan, polysulfide resin. A given curative is selected alone or in combination with other curative to a desired cure rates and may be used in appropriate combinations to strike the right balance between open time and mechanical properties (i.e., to achieve desired cure properties).

The inorganic particulate material is present in part B is any one of those detailed with respect to part A. It is appreciated that the part B inorganic particulate material is the same type of material as used in part A, or can chemical composition, size, shape, size distribution, or a combination thereof. Through inclusion of the comparatively large inorganic particulate material in both parts A and B mixing is reduced to obtain homogenous distribution of such particulate, relative to such particulate segregated to either part alone.

The other components in the part B provided in Table 2 have the identities and amounts as detailed above with respect to part A.

TABLE 2

Weight percentage of constituent ingredients of part B.

| Ingredients | Typical Weight (%) of part B | Specific Weight (%) of part B |
| --- | --- | --- |
| Curative(s) | remainder | remainder |
| Inorganic particulate material | 50-83 | 60-75 |
| Cure inhibitor | 0-5 | 0.01-0.3 |
| Cure accelerator | 0-5 | 0.01-0.3 |
| Thixotrope | 0-5 | 3-5 |
| Pigment | 0-1 | 0.005-0.1 |
| Various additives: powder or fiber filler, toughening agent corrosion inhibitor, impact modifier, fire retardant, each present at: | 0-5 | 0.2-1.5 |

An inventive formulation in some inventive embodiments includes a toughening agent. A toughening agent is distinguished from an impact modifier in the present invention in having a lower Tg and can significantly improve the performance of cured compositions at low temperatures such as −40° F. (−40° C.) and at the same time does not cause a negative impact on the performance of cured compositions at elevated temperatures such as 180° F. whereas the rubber component used in this invention are the core-shell structured impact modifiers and provide not only excellent impact strength but also non-sag, excellent thixotropic property and improved antisliding performance. Toughening agents operative herein illustratively include reactive liquid polymers (RLPs) that contain functional groups, usually on their terminal ends but occasionally as pendant groups that react with the resin in situ to form elastomeric domains. Examples of RLPs include, without limitation, vinyl terminated acrylonitrile butadiene (VTBN), carboxyl-terminated butadiene acrylonitrile (CTBN), amine-terminated butadiene acrylonitrile (ATBN), hydroxyl-terminated butadiene acrylonitrile (HTBN), epoxy-terminated butadiene acrylonitrile (ETBN), mercapto-terminated butadiene acrylonitrile (MTPN), and phenoxy-terminated butadiene acrylonitrile (PTBN). In specific embodiments of the present invention, the toughening agent includes aminated version of any of the aforementioned RLPs. It is appreciated that a toughening agent is present as a component of part A, part B, or both parts of an inventive formulation. In specific embodiments of the present invention, a toughening agent is present only in a part B but it is appreciated that the amount of toughening agent present depends on characteristics of the toughening agent as well as the weight ratio between part A:part B.

Regardless of the form of an inventive formulation, upon induction of pot life for the formulation, the formulation is applied to a substrate create a coating thickness of between 5 and 20 mm and allowed to cure to form a coating that affords substrate protection or is operative as a primer for subsequent material applications. In some inventive embodiments, the fully mixed formulation has sufficient viscosity to be applied to a vertical or even overhead substrate. As inventive formulations typically achieve a rapid build in strength per ASTM D 1002 for a time period of from 5 minutes to 90 minutes. As an inventive formulation cures through typically nucleophilic ring opening addition reaction; in case of amines and amides; followed by crosslinking.

As a person skilled in the art will recognize from the previous detailed description and from the figures and claims, modifications and changes can be made to the preferred embodiments of the invention without departing from the scope of this invention defined in the following claims.

The invention claimed is:

1. A two-part composition formulation comprising:
   a composition part A comprising:
     phenol novolac epoxy in combination with a bisphenol F epoxy, bisphenol A epoxy, or a combination thereof that define a base resin with a weight ratio of said phenol novolac epoxy: bisphenol F and/or bisphenol A is 0.2-4:1;
     a resorcinol diglycidyl ether present in a ratio of 1.5-25:1 relative to said base resin; and
     a part A inorganic particulate has x-y-z average linear dimension of between 500 and 6,000 microns present from 50 to 83 weight percent of said composition part A; and
   an activator part B comprising:
     a curative operative to cure said base resin and said resorcinol diglycidyl ether; and
     a part B inorganic particulate has x-y-z average linear dimension of between 500 and 6,000 microns.

2. The formulation of claim 1 wherein said base resin is present from 10 to 45 weight percent of the part A.

3. The formulation of claim 1 wherein the part A further comprises an epoxy-terminated butadiene acrylonitrile copolymer (ETBN), a cyclohexanedimethanol diglycidyl ether, or a combination thereof.

4. The formulation of claim 1 further comprising an impact modifier.

5. The formulation of claim 4 wherein said impact modifier is at least one of a styrene butadiene copolymer, a rubber, a polycarbonates, a core-shell rubber (CSR) in epoxy resin, a latex rubber particle with a crosslinked polymeric shell in epoxy resin, a siloxane core with a crosslinked polymeric shell, or a combination thereof with the proviso that said impact modifier is only in part A if curable epoxy moieties are present.

6. The formulation of claim 4 wherein said impact modifier is at least one of methyl methacrylate butadiene styrene copolymers (MBS), nitrile rubber, a blocked copolymer of styrene butadiene, acrylonotrile butadiene styrene, or combinations thereof.

7. The formulation of claim 1 wherein said part A inorganic particulate is spherical.

8. The formulation of claim 1 wherein said part A inorganic particulate is irregular in shape and has an aspect ratio between longest and shortest orthogonal directions of between 1 and 1.6.

9. The formulation of claim 1 wherein said part A inorganic particulate is polycrystalline or amorphous.

10. The formulation of claim 1 wherein said part A inorganic particulate is an oxide of aluminum, gallium, silicon, magnesium, transition metals, or a combination thereof or a hydrous oxide thereof; nitrides of aluminum, gallium, silicon, transition metals, or a combination thereof; or carbonates of calcium, magnesium, or a combination thereof.

11. The formulation of claim 1 wherein said part A inorganic particulate is pre-coated with a curable resin.

12. The formulation of claim 1 wherein said part B inorganic particulate has a chemical composition and a size of said part A inorganic particulate.

13. The formulation of claim 1 wherein said part A further comprising a cure inhibitor, a cure accelerator, a thixotrope, a powder or fiber filler, a pigment, a plasticizer, a chain terminating agent, a corrosion inhibitor, a fire retardant, or a combination thereof.

14. The formulation of claim 1 wherein at least one of part A or part B further comprises an adhesion promoter.

15. The formulation of claim 1 wherein said curative has amine functionality.

16. The formulation of claim 1 wherein said part B further comprises at least one of: an impact modifier, a cure inhibitor, a cure accelerator, a thixotrope, a pigment, a plasticizer, a powder or fiber filler, a corrosion inhibitor, or a fire retardant.

17. A structure comprising:
   a substrate; and
   a coating having a thickness of between 5 and 20 mm formed by the cure of the formulation of claim 1 in simultaneous contact with said substrate.

18. A process of forming an abrasion resistance coating on a substrate from the formulation of claim 1 comprising:
   mixing said part A and said part B to form a curable composition;
   applying said curable composition to the substrate to form a coating having a thickness of between 5 and 20 mm wherein said substrate is in a vertical or overhead orientation; and
   allowing said curable composition to cure to form the abrasion resistance coating.

19. The process of claim 18 wherein the substrate is one of: an oil exploration component, industrial processing equipment, a water heater, mining equipment, construction equipment, metallurgy equipment, a combustion engine, a scrubber, or ash handling equipment.

20. The process of claim 18 further comprising exposing the abrasion resistance coating to a pH below 4 or pH 10 at a temperature of between 100 and 175 degrees Celsius.

* * * * *